United States Patent
Yamaguchi et al.

(10) Patent No.: US 8,119,279 B2
(45) Date of Patent: Feb. 21, 2012

(54) CASING FOR FUEL BATTERY AND FUEL BATTERY USING THE SAME

(75) Inventors: Hidehisa Yamaguchi, Kumagaya (JP); Yuji Kawauchi, Yasugi (JP); Setsuo Andoh, Saitama (JP)

(73) Assignee: Hitachi Metals, Ltd., Tokyo (JP)

( * ) Notice: Subject to any disclaimer, the term of this patent is extended or adjusted under 35 U.S.C. 154(b) by 996 days.

(21) Appl. No.: 12/066,937

(22) PCT Filed: Sep. 15, 2006

(86) PCT No.: PCT/JP2006/318350
§ 371 (c)(1),
(2), (4) Date: Mar. 14, 2008

(87) PCT Pub. No.: WO2007/032468
PCT Pub. Date: Mar. 22, 2007

(65) Prior Publication Data
US 2009/0286120 A1      Nov. 19, 2009

(30) Foreign Application Priority Data

Sep. 16, 2005 (JP) .................. 2005-270435
Dec. 26, 2005 (JP) .................. 2005-372371

(51) Int. Cl.
*H01M 2/00* (2006.01)

(52) U.S. Cl. .......... 429/163; 429/177; 429/151

(58) Field of Classification Search .......... 429/151, 429/153, 159, 163, 168, 177
See application file for complete search history.

(56) References Cited

U.S. PATENT DOCUMENTS

| | | | |
|---|---|---|---|
| 4,770,946 A | 9/1988 | Yamauchi et al. | |
| 5,449,575 A * | 9/1995 | Moulton | 429/179 |
| 2003/0012999 A1 | 1/2003 | Yoshioka et al. | |
| 2004/0136156 A1 | 7/2004 | Nakamura et al. | |

FOREIGN PATENT DOCUMENTS

| | | |
|---|---|---|
| JP | 61-96073 A | 5/1986 |
| JP | 61-276982 A | 12/1986 |
| JP | 3-240975 A | 10/1991 |
| JP | 5-186893 A | 7/1993 |
| JP | 2001-152393 A | 6/2001 |
| JP | 2003-86207 A | 3/2003 |
| JP | 2003073843 | 3/2003 |
| JP | 2004-220594 A | 8/2004 |
| JP | 2004-292858 A | 10/2004 |
| JP | 2005-121429 A | 5/2005 |
| JP | 2005-518646 A | 6/2005 |
| JP | 2006-161155 A | 6/2006 |
| JP | 2006-233315 A | 9/2006 |

\* cited by examiner

*Primary Examiner* — Thanhha Pham
(74) *Attorney, Agent, or Firm* — Sughrue Mion, PLLC

(57) ABSTRACT

This invention provides a casing for storing MEA, which has satisfactory corrosion resistance to formic acid produced in an electrode reaction of MEA. There is also provided a casing formed of a material having the lowest possible specific gravity that can apply a suitable pushing pressure to MEA and a current collector without increasing the thickness dimension and is suitable for a power supply mounted, for example, in small portable electronic equipment. The casing is a casing for use in a fuel battery in which a hydrogen electrode, an oxygen electrode, and a film-electrode joint product formed of a proton conductive film held between the hydrogen electrode and the oxygen electrode are housed within the casing and, in removing water produced in an oxygen electrode reaction, the above water comes into contact with the casing. The casing for a fuel battery comprises a base material (2*a*) formed of a magnesium alloy and a film (2*b*) provided on the base material (2*a*). The film (2*b*) comprises a conversion treated film (2*ba*), an undercoating layer (2*bb*), and a top coating layer (2*bd*) provided in that order from the base material side.

5 Claims, 10 Drawing Sheets

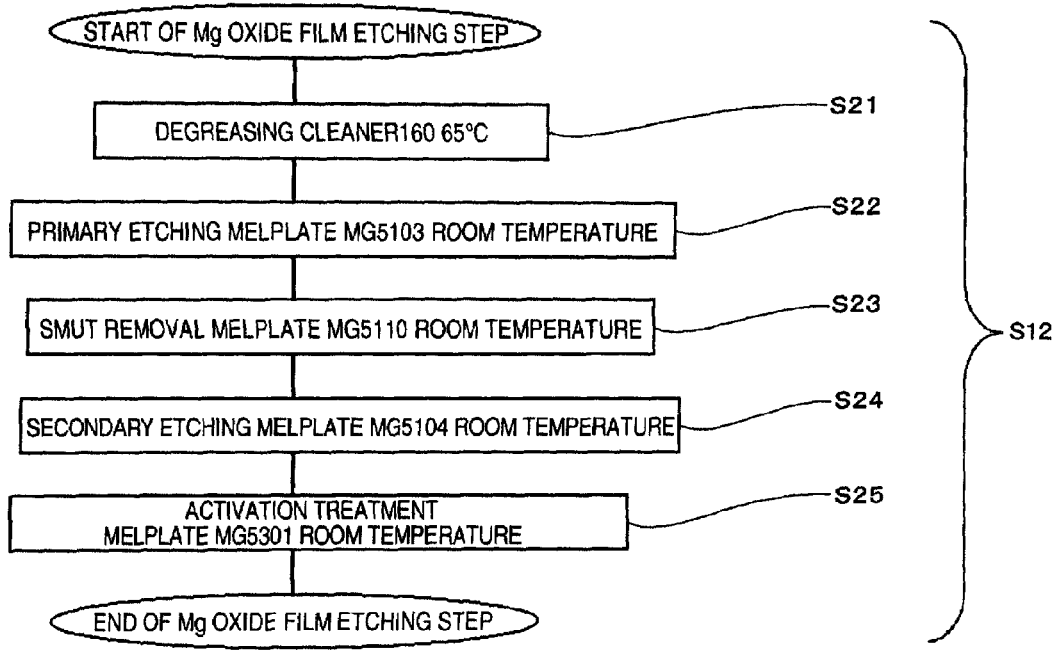
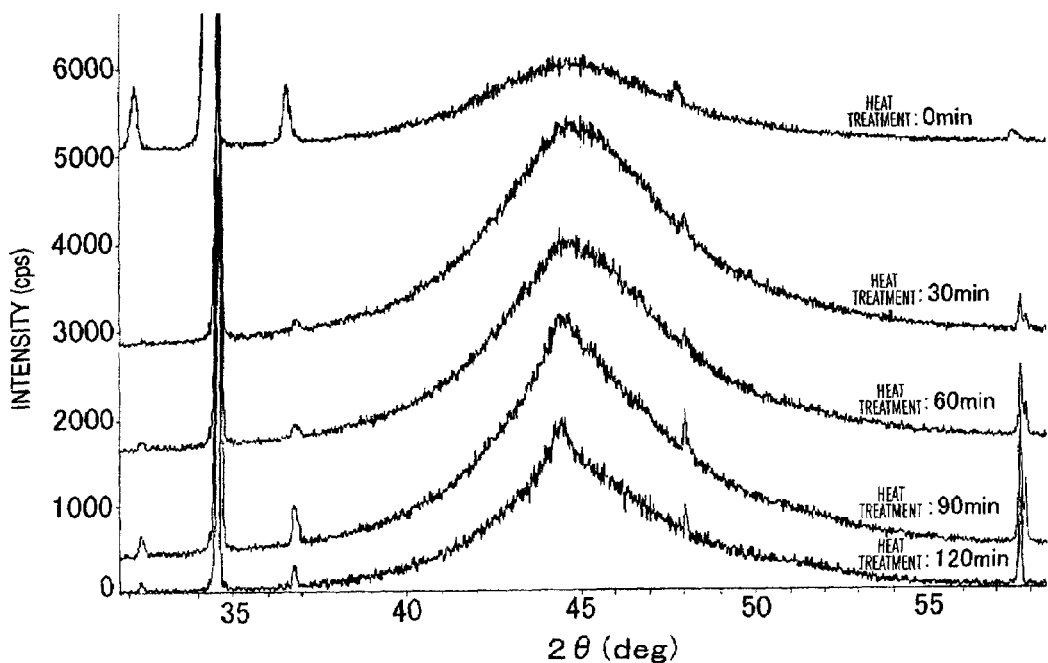

US 8,119,279 B2

CASING FOR FUEL BATTERY AND FUEL BATTERY USING THE SAME

This application is a 371 of PCT/JP2006/318350 filed Sep. 15, 2006 claiming the priority of JP2005-270435 filed Sep. 16, 2005 and JP2005-372371 filed Dec. 26, 2005, all of which are hereby incorporated by reference.

TECHNICAL FIELD

The present invention relates to a casing for a liquid fuel cell producing electricity by using liquid fuel such as methanol which casing contains electrodes, a proton exchange membrane, and the like; and a fuel cell including the casing.

BACKGROUND ART

In recent years, in the field of electronic devices, there have been rapid developments of compact and portable electronic devices represented by mobile phones and personal digital assistants according to technical advances. Under the circumstances, there is a need for batteries for such electronic devices which batteries are compact and usable for a long time. As for such batteries, there is an industry-wide shift from conventional single-use primary batteries to secondary batteries, which can be charged and discharged repeatedly. An example of the secondary batteries is a nickel hydrogen secondary battery, and the battery has been developed to achieve higher performance. Another secondary battery, a lithium ion secondary battery, which has even higher performance, has also been developed and certain performance has already been obtained. The lithium ion secondary battery is nearing widespread commercialization. However, portable electronic devices are dramatically gaining more functions and higher performance, thereby increasing the power consumption of the devices. Thus a high performance battery is required that can ensure sufficiently long hours of continuous operation for portable electronic devices. Under these circumstances, a fuel cell receives attention as a next generation battery replacing the secondary batteries.

Fuel cells using hydrogen gas as their fuel generally provide high power densities. Thus a polymer electrolyte fuel cell (PEFC) using hydrogen fuel has been developed as a power supply for a high-speed movable body such as an electric vehicle or as a distributed power supply for homes, offices, stores, or the like.

Typically, the PEFC is formed by stacking a plurality of cell units to configure a stack thereby increasing power output. Each of the cell units is a membrane and electrode assembly (MEA) composed of a hydrogen electrode (anode), an oxygen electrode (cathode), and a proton exchange membrane (PEM) interposed between the electrodes.

The cell unit gains electromotive force via oxidation reaction occurred in the hydrogen electrode and reduction reaction occurred in the oxygen electrode by providing hydrogen to the hydrogen electrode as fuel and providing oxygen or air to the oxygen electrode as an oxidizing agent. A platinum catalyst is used in the electrodes for promoting the electrochemical reactions in the electrodes. Protons (hydrogen ions) generated on the hydrogen electrode moves to the oxygen electrode via the PEM.

However, the fuel cells using PEFC are not suitable as the power supplies for electronic devices such as compact and portable devices because the cells have problems such as requiring upgrading of infrastructure for providing hydrogen gas fuel, and having low energy densities per unit volume of hydrogen gas. In order to overcome such problems, there has been investigated a reforming type fuel cell in which hydrogen is obtained by reforming hydrocarbon fuel or liquid fuel such as methanol. However, such a fuel cell is also not suitable as the power supplies for portable devices and the like because the fuel cell requires a reforming device besides the fuel cell itself.

As a technique applicable to size reduction of fuel cells, a direct methanol fuel cell (DMFC) has been developed that has a power generation cell configuration similar to the PEFC and effects anode oxidation reaction by providing methanol as fuel directly to an anode electrode. The DMFC, where methanol is provided directly to the anode, is an electric power generator operable at ordinary temperature. The DMFC has an advantage of easily achieving its size reduction because methanol fuel is provided directly to the anode and the DMFC does not require a reforming device for extracting hydrogen from liquid fuel. Methanol has high energy density and provides ease of handling.

The DMFC uses as anode fuel a methanol aqueous solution at a concentration of from 3% to 64% by mass. According to an anode equation: $CH_3OH+H_2O \rightarrow CO_2+6H^++6e$, 1 mole of water is required to 1 mole of methanol, and the concentration of a methanol aqueous solution in this case is 64% by mass. The higher the concentration of methanol fuel is, the further the volume of a cell including a fuel container per energy capacity can be decreased. However, the higher the methanol concentration is, the more pronounced a crossover phenomenon becomes where methanol passes through the proton exchanger to react with oxygen on the cathode side thereby decreasing output voltage. In order to inhibit the phenomenon, an optimum methanol concentration is decided depending on the methanol permeability of a proton exchanger to be used. The cathode equation of the DMFC is $3/2O_2+6H^++6e \rightarrow H_2O$, and the DMFC uses oxygen in air as cathode fuel.

Methods for providing the anode fuel and the cathode fuel to the catalyst layers of electrodes respectively include an active mode of effecting the forced circulation of the fuels by using an auxiliary machine such as a pump; and a passive mode of providing fuels without using auxiliary machines by exposing the catalyst layer to air in the case of gaseous fuel or by using capillary action or gravity drop in the case of liquid fuel. The active mode has advantages such as enabling high power output by providing air, and enabling use of high concentration methanol fuel by circulating water produced at the cathode, whereas the mode has disadvantages of the difficulty of achieving size reduction because an auxiliary machine is required for providing fuel, and electric power consumption by the auxiliary machine. The passive mode has an advantage of being suitable for achieving size reduction, whereas the mode has a disadvantage of being difficult to obtain high power output because providing fuel tends to become a rate-determining step.

One cell unit of a fuel cell has low output voltage, and a plurality of cell units is stacked electrically in series according to required voltage for load. The methods of stacking cell units include plane stacking of arranging the cell units on a plane; and bipolar stacking of heaping the cell units via a separator the both surfaces of which have fuel channels. The plane stacking is suitable for compact fuel cells for portable devices and the like because the cathode electrodes of all the cell units are exposed on the surfaces and air can be easily taken in whereby thinner fuel cells can be produced.

As mentioned above, the passive type fuel cell is suitable for size reduction whereas providing fuel tends to become a rate-determining step and it is difficult to obtain high power output. In general, a fuel cell with larger electrode area produces larger power output. In order to achieve higher power output in the passive mode, it is effective to employ the plane stacking and making the area of an oxygen electrode as large as possible within the size of portable devices or the like to which the fuel cell is mounted. Therefore, a power supply suitable for mounting on compact and portable electronic devices and the like is a passive-mode direct methanol fuel cell in which cell units are stacked in the plane.

When such a fuel cell has a membrane and electrode assembly with large area which assembly comprises a proton exchange membrane, a hydrogen electrode, and an oxygen electrode which membrane is interposed between the electrodes, shape irregularities such as warp or waviness tend to occur on the sheet-like membrane and electrode assembly because of low processing accuracy, and which results in problems such as being incapable of achieving uniform contact between the membrane and electrode assembly and a current collector. As a result, fuel cells with large areas have a problem of low current collecting efficiency, which means that the ratio of electric power that can be extracted via a current collecting plate with respect to electric power actually produced in the membrane and electrode assembly becomes low. In order to achieve uniform contact between the membrane and electrode assembly and the current collector, it is necessary to apply excessively large pressing force of the current collector against the membrane and electrode assembly or to control the distribution of the pressing force. The proton exchange membrane, the hydrogen electrode, and the oxygen electrode which electrodes sandwich the membrane are often formed as a single-piece configuration: MEA. In order to achieve uniform contact between the MEA and a current collector with which electric power is extracted from the electrodes, it is preferred that the casing contains the MEA and the current collector, and pressing force is applied to the MEA and the current collector by the casing.

Such a fuel cell is, for example, described in Patent Document 1, and FIG. 6 is the exploded perspective view of the fuel cell. This fuel cell card is formed as a PC-card-sized functional card by stacking seven main plate-like components. The fuel cell card is mainly composed of, in the order from top to bottom, an upper casing 214 of the fuel cell; an upper current collector 216 on the oxygen side; a pair of membrane and electrode assemblies 211 and 211 provided at upper position from the center of the fuel cell; a hydrogen supplying part 213 for supplying hydrogen as fuel gas which part is positioned at the center of the fuel cell; a pair of membrane and electrode assemblies 212 and 212 provided at lower position from the center of the fuel cell; a lower current collector 217 on the oxygen side; and a lower casing 215 paired with the upper casing 214 to form the casing of the fuel cell. To the fuel cell card, a hydrogen occluded stick 218 can be connected. The stick is a plate having almost the same thickness as the fuel cell card and can supply hydrogen. Hydrogen is supplied from a rod-like projection 220 formed on the connecting side of the hydrogen occluded stick 218.

The fuel cell card is formed to have rounded corners for providing good portability. The card is configured so that the plate-like upper casing 214 is combined with the lower casing 215, and the upper casing 214 is fixed to the lower casing 215 by using screws or the like (not shown). The upper casing 214 has a plurality of openings 231 as a gas inlet for introducing oxygen into the casing. In this example, each of the openings 231 is a nearly rectangle through-hole, and two units of 15 holes arranged in 5 lines and 3 rows are formed side by side. The upper casing 214 has 30 openings 231 in total. Through the openings 231, the electrode on the oxygen side is exposed to air as mentioned later, whereby oxygen is introduced sufficiently without additional air intake devices. Water is produced from the membrane and electrode assemblies 211 and 212 on the production of electromotive force. But water produced on the surfaces of the electrodes can be removed sufficiently because the openings 311, 231, 261, and 241 are opened widely and the assemblies are exposed to air.

The upper casing 214 and the lower casing 215 may be made of metallic material such as stainless steel, iron, aluminum, titanium, or magnesium; resin material excellent in heat resistance and chemical resistance such as epoxy resin, ABS, polystyrene, PET, or polycarbonate; or composite material such as fiber reinforced resin. The plate portions of the upper casing 214 and the lower casing 215 have openings 231 and 241, which are rectangle cutouts, formed in two units of holes arranged in 5 lines and 3 rows.

Patent Document 1: JP-A-2003-86207 (paragraphs 0048 and 0061, FIGS. 5 and 8)

In the DMFC, a phenomenon called crossover occurs where unreacted methanol passes through an electrolytic membrane to reach the cathode. The methanol leaking to the cathode side in the crossover is directly subjected to electrooxidation to produce formic acid as a by-product. The formic acid is a highly corrosive by-product voluntarily dissolving in water. The formic acid dissolves in water produced on the production of electromotive force to produce an aqueous formic acid solution. The aqueous formic acid solution is ejected from the system via the openings 311, 261, 231, and 241 of the upper current collector 216, the lower current collector 217, the upper casing 214, and the lower casing 215. In the course of the ejection, the aqueous formic acid solution contacts the upper current collector 216, the lower current collector 217, the upper casing 214, and the lower casing 215, and can corrode these parts.

The Patent Document 1 discloses preparing the casing by using metallic material or resin material excellent in heat resistance and chemical resistance. A casing made of metallic material obviously causes the problem of corrosion. A casing made of resin material overcomes the problem of corrosion caused by formic acid. However, a casing is required to have high mechanical strength to apply pressing force to an MEA and a current collector for the purpose of achieving uniform contact between the MEA and the current collector. In order to obtain the strength by using resin material, the thickness of a casing has to be increased. As a result, a casing made of resin material has large thickness and heavy weight, and such a casing is difficult to employ for a power supply mounted on compact and portable electronic devices and the like.

An object of the present invention is, therefore, to provide a casing containing an MEA which casing is sufficiently corrosion resistant to formic acid produced by the electrode reaction of the MEA. Another object of the present invention is to provide a casing made of material having a specific gravity as small as possible which casing can apply appropriate pressing force to an MEA and a current collector without increasing the thickness of the casing and which casing is suitable for a power supply mounted on compact and portable electronic devices and the like.

DISCLOSURE OF THE INVENTION

The objects of the present invention can be achieved by employing a casing made of a magnesium alloy on the surface of which a chemical conversion coating or an aluminum oxide coating is formed.

That is, the first aspect of the present invention is a casing for a fuel cell containing a membrane and electrode assembly comprising a hydrogen electrode, an oxygen electrode, and a proton exchange membrane interposed between the electrodes in the casing where water produced in reaction at the oxygen electrode contacts the casing when the water is removed, characterized in that the casing comprises a base member made of a magnesium alloy, and a coating having, in order from the base member side, a chemical conversion coating, an undercoating layer, and an overcoating layer.

The second aspect of the present invention is a fuel cell containing a membrane and electrode assembly comprising a hydrogen electrode, an oxygen electrode, and a proton exchange membrane interposed between the electrodes in a casing where water produced in reaction at the oxygen electrode contacts the casing when the water is removed, characterized in that the casing comprises a base member made of a magnesium alloy, and a coating having, in order from the base member side, a chemical conversion coating, an undercoating layer, and an overcoating layer.

In the first and second aspects of the present invention, the overcoating layer preferably contains metallic particles subjected to a surface treatment for imparting acid resistance to the particles for the purpose of obtaining corrosion resistance to formic acid at high concentration.

The third aspect of the present invention is a casing for a fuel cell containing a membrane and electrode assembly comprising a hydrogen electrode, an oxygen electrode, and a proton exchange membrane interposed between the electrodes in the casing where water produced in reaction at the oxygen electrode contacts the casing when the water is removed, characterized in that aluminum oxide is formed on a magnesium alloy, and between the magnesium alloy and the aluminum oxide, a plating layer mainly containing nickel and a plating layer mainly containing aluminum are formed.

In the third aspect of the present invention, the plating layer mainly containing nickel preferably has a thickness of 8 to 12 μm.

In the third aspect of the present invention, the plating layer mainly containing aluminum preferably has a thickness of 12 to 150 μm.

In the third aspect of the present invention, compressive stress is preferably applied to the plating layer mainly containing aluminum and the plating layer mainly containing nickel.

The fourth aspect of the present invention is a method for producing a casing for a fuel cell which casing has aluminum formed on a magnesium alloy, characterized by comprising a nickel plating step of forming a plating layer mainly containing nickel on the magnesium alloy; an aluminum plating step of forming a plating layer mainly containing aluminum on the plating layer mainly containing nickel; and a heat treatment step of conducting a heat treatment after the aluminum plating step.

In the fourth aspect of the present invention, the method preferably comprises an anodizing step of anodizing the plating layer mainly containing aluminum to form an aluminum oxide layer after the heat treatment step.

In the fourth aspect of the present invention, the heat treatment step is preferably conducted at a temperature of from 180° C. to 300° C.

In the fourth aspect of the present invention, the heat treatment step is preferably conducted in air.

In the fourth aspect of the present invention, the method preferably comprises a magnesium oxide film etching step of removing an oxide layer on a surface of the magnesium alloy by wet etching before the nickel plating step.

ADVANTAGE OF THE INVENTION

As mentioned above, the casing for a fuel cell according to the present invention is made of a magnesium alloy, and thus can apply appropriate pressing force to an MEA and a current collector without increasing the thickness of the casing while the portability (being thin and lightweight) of compact and portable electronic devices is not impaired. Although the magnesium alloy is a highly reactive material and easily suffered from corrosion, the coating with high corrosion resistance can prevent corrosion and discoloration of the casing even when formic acid at high concentration is produced in the DMFC.

BEST MODE FOR CARRYING OUT THE INVENTION

First Best Mode

Hereinafter, the present invention is described in detail with referring to examples, but, the present invention is not restricted to the examples. FIG. 1 is a section view (a) and a plan view (b) of a DMFC according to the present invention. A lower casing 3 contains two units of membrane and electrode assembly 7 composed of a hydrogen electrode 10, an oxygen electrode 9, and a proton exchange membrane 8 interposed between the electrodes. The two membrane and electrode assemblies 7 are positioned so that the hydrogen electrodes 10 of the assemblies face to each other and a liquid fuel retaining member 11 is interposed between the hydrogen electrodes 10. Both of the oxygen electrodes 9 are positioned on the outer sides of the assemblies 7. The lower casing 3 contains current collecting plates 6 on the outer sides of the oxygen electrodes 9. On the lower casing 3 containing the components, an upper casing 2 is mounted and fixed by using screws through screw holes 5. The current collecting plates 6, the membrane and electrode assemblies 7, and the liquid fuel retaining member 11 are thus interposed between the bottom surface of the lower casing 3 and the upper casing 2 and subjected to pressing force. The upper casing 2 and the lower casing 3 are made of a magnesium alloy with higher mechanical strength than resin materials and the casings do not warp even when the casings have relatively thinner thicknesses, thereby applying appropriate pressing force uniformly to the current collecting plates 6. As a result, uniform contacts are achieved between the current collecting plates 6 and the membrane and electrode assemblies 7. As a consequence, decrease of current collecting efficiency can be prevented even in fuel cells with large electrode areas. Also, since a magnesium alloy has a specific gravity about two thirds of an aluminum alloy, use of a magnesium alloy contributes to decrease of the weight of the casing and does not impair the portability of compact and portable electronic devices. Note that current collecting plates between the hydrogen electrodes 10 and the liquid fuel retaining member 11 are not shown in FIG. 1. Also, electrical insulating sheets are interposed between the current collecting plate 6 and the upper casing 2 and between the current collecting plate 6 and the lower casing 3, but the sheets are not shown in FIG. 1.

The upper casing 2 and the lower casing 3 are equipped with venting holes 4. Air is taken in via the venting holes 4 by natural convection or diffusion and oxygen is supplied to the oxygen electrode 9. Methanol, as fuel, is supplied to the hydrogen electrode 10 from the liquid fuel retaining member 11. Electrons are released by anode reaction and produced protons reach the oxygen electrode 9 via the proton exchange membrane 8. Cathode reaction occurs between the protons and the oxygen whereby electrons are received and water is produced. The water is ejected into air by natural convection or diffusion via the venting holes 4 formed in the current collecting plate 6 and the upper casing 2. In the same manner, the water is ejected via the venting holes 4 formed in the current collecting plate 6 and the lower casing 3.

Methanol leaking to the oxygen electrode 9 sides by the crossover is directly subjected to electrooxidation to produce formic acid as a by-product. The formic acid is a highly corrosive by-product voluntarily dissolving in water. The formic acid dissolves in water produced on the production of electromotive force to produce an aqueous formic acid solution. The aqueous formic acid solution is ejected in air via the venting holes 4. In the course of the ejection, the aqueous formic acid solution contacts the upper casing 2 and the lower casing 3, and can corrode these parts.

Example 1 and Comparative Example 1

The following experiments were conducted to examine the corrosion resistance of a casing made of a magnesium alloy subjected to a surface treatment.

Experimental Method

A casing made of a magnesium alloy subjected to a surface treatment was immersed in each solution and time until corrosion occurs was measured.

[Immersion Solution]
Formic acid: 30 ppm and 5%
Acetic acid: 30 ppm and 5%
Methanol: 10%
Hydrochloric acid: 10%

[Surface Treatment]
Four types of experimental samples S1 to S4 were prepared where different surface treatments were conducted.

S1: (a)+(b)+(c)+(d)
S2: (a)+(b)+(c)
S3: (a)+(b)
S4: (a)+(b)+(d)
(a) a chemical conversion coating: manganese phosphate based
(b) an undercoating layer (primer): epoxy based
(c) an overcoating layer (color coating): acryl based
(d) a clear coating layer: acrylic silicon based

[Coating Thickness]
S1: (a)+(b)+(c)+(d): only (b) was changed among 10/20/30 μm; (c) fixed at 20 μm; (d) fixed at 20 μm
S2: (a)+(b)+(c): (b) fixed at 20 μm; only (c) was changed among 7/15/25 μm
S3: (a)+(b): only (b) was changed among 10/20/30 μm
S4: (a)+(b)+(d): (b) fixed at 20 μm; only (d) was changed among 7/15/25 μm
*(a) chemical conversion coatings have an identical thickness over all samples.

[Coating Formation]
Steps of forming the (a) to (d) are shown in detail in Table 1. The configuration of the coating is shown in FIG. 2. For example, in S, on a magnesium alloy base member 2a of a casing 2, there was formed a coating 2b composed of, in order from the base member side, a chemical conversion coating 2ba, an undercoating layer 2bb, an overcoating layer 2bc, and a clear coating layer 2bd.

TABLE 1

Coating Step Details
*Step: (a)chemical conversion treatment→(b)primer coating→(c)color coating→(d)clear coating (a) Chemical conversion treatment details

| No. | Step | Treatment method | Tank volume | Chemical name | Initial make-up amount of electrolytic bath | Temperature (° C.) | Time |
| --- | --- | --- | --- | --- | --- | --- | --- |
| 1 | Hot water washing | Spray | 1600 L | — | — | 55-65 | 90 seconds |
| 2 | Main degreasing | Spray | 2700 L | FINECLEANER MG159 (FC-MG159) | FC-MG159 32 Kg | 55-65 | 180 seconds |
| 3 | First water washing | Spray | 800 L | — | — | Room temperature | 30 seconds |
| 4 | Second water washing | Spray | 900 L | — | — | Room temperature | 30 seconds |
| 5 | Third water washing | Spray | 1000 L | Industrial water | — | Room temperature | 30 seconds |
| 6 | Chemical conversion | Spray | 3700 L | MAGBOND P20 (MB-P20) | MB-P20M 130 Kg | 40-50 | 180 seconds |
| | | | | Neutralizer 4055 (NT-4055) | NT-4055 8 Kg | Room temperature | |
| 7 | Fourth water washing | Spray | 800 L | — | — | Room temperature | 30 seconds |
| 8 | Fifth water washing | Spray | 900 L | — | — | Room temperature | 30 seconds |
| 9 | Sixth water washing | Spray | 1000 L | — | — | Room temperature | 30 seconds |
| 10 | Circulating pure water washing | Spray | 900 L | — | — | Room temperature | 30 seconds |
| 11 | Pure water washing | Spray | | Deionized water | — | Room temperature | |

Concentration measuring method

| No. | Concentration | Sampling amount | Indicator | Titrant | End point | Supplying amount |
| --- | --- | --- | --- | --- | --- | --- |
| 1 | — | — | — | — | — | — |
| 2 | Total alkalinity (TAL) 5-7 pt | 10 mL | D-11 | T-20 | blue→yellow | Supplying 5.4 kg of FC-MG159 to increase total alkalinity by 1 pt |
| 3 | — | — | — | — | — | Supplying water used in the second water washing |
| 4 | — | — | — | — | — | Supplying water used in the third water washing |
| 5 | — | — | — | — | — | Continuously supplying industrial water |

TABLE 1-continued

Coating Step Details
*Step: (a)chemical conversion treatment→(b)primer coating→(c)color coating→(d)clear coating

| | | | | | | |
|---|---|---|---|---|---|---|
| 6 | Free acidity (FA) 0.5-1.5 pt | 10 mL | D-11 | T-11 | yellow→blue | Supplying 1.7 Kg of MB-P20R to increase free acidity by 0.1 pt |
| | Total acidity (TA) 6-12 pt | 10 mL | D-3 | T-11 | colorless→red | |
| 7 | — | | | | — | Supplying water used in the fifth water washing |
| 8 | — | | | | — | Supplying water used in the sixth water washing |
| 9 | — | | | | — | Supplying water used in the circulating pure water washing |
| 10 | Conductivity 30 μs/cm or less | | measured with conductivity meter | | | Supplying water used in the spray pure water washing |
| 11 | — | | — | — | — | Deionized water |

(b) primer coating to (d) clear coating

| Step | Coating material name | Coating method | Drying time |
|---|---|---|---|
| (b) primer coating | Tough Primer/gray EP-704 | Electrostatic coating | 130° C. × 25 minutes |
| (c) color coating | Acryst/silver | Electrostatic coating | 140° C. × 25 minutes |
| (d) clear coating | ARCO SP No. 100 clear | Spindle coating | 140° C. × 20 minutes |

The results of the immersion experiments are shown in FIG. 4.

No corrosion or discoloration was observed when experimental samples S1 and S2 were immersed in each of the solutions of 30 ppm formic acid, 30 ppm acetic acid, and 10% methanol even after a lapse of about 10,000 hours. Every experimental sample immersed in each of the solutions of 5% formic acid, 5% acetic acid, and 10% hydrochloric acid was subjected to corrosion and/or discoloration within 100 hours, and the experiment was abandoned when the corrosion and/or discoloration occurred. The discoloration was schematically shown in FIG. 5.

Example 2

Next, the coating was improved for the purpose of increasing its corrosion resistance to each of the solutions of 5% formic acid, 5% acetic acid, and 10% hydrochloric acid. As a result of investigation, it was found that the corrosion and the discoloration are caused because aluminum flakes contained in a coating material for forming an overcoating layer (color coating) react with the immersion solutions. DMFCs are mounted on compact and portable devices, and DMFCs preferably have metallic appearances similar to the appearances of the devices in terms of design. To impart metallic appearances to DMFC casings, metallic particles such as aluminum flakes are added to coating materials used for color coating.

In Example 2, a coating was prepared to have the configuration of experimental sample S2: (a)+(b) 20 μm+(c) 20 μm where the (c) overcoating layer was formed by using HALS hybrid resin baking type coating material (base compound name: Acryo #BK6500). The base compound is characterized by containing aluminum flakes the surfaces of which are subjected to a surface treatment for imparting acid resistance to the flakes. The results of immersion experiments conducted in the same manner as Example 1 are shown in FIG. 3. The times until corrosion and/or discoloration occur are increased from 100 hours to 408 hours in the 5% formic acid solution, from 100 hours to 840 hours in the 5% acetic acid solution, and from 100 hours to 648 hours in the 10% hydrochloric acid solution. Thus the corrosion resistance was considerably improved.

Second Best Mode

In recent years, devices such as mobile phones, music players, and personal computers have been developed to be compact and lightweight, and users carry and use such devices. Thus casings for such devices are required to have sufficient mechanical strength and light weight. An optimum material for such casings is an alloy of light metal represented by aluminum. In particular, a magnesium (Mg) alloy is preferable because the alloy has high mechanical strength and a specific gravity about two thirds of aluminum (Al).

However, Mg alloys have a drawback of being extremely susceptible to corrosion in air. Thus Mg alloys are required to have corrosion resistance by being subjected to a surface treatment. The surfaces of the casings are generally colored to have various colors according to an intended use. JP-A-2004-292858 describes the structure of a magnesium alloy member where the surface of the Mg alloy is covered with an aluminum oxide layer which is excellent in corrosion resistance and is easily colored.

In the structure, an Al layer is formed on the Mg alloy by plating and the surface of the Al layer is anodized to form the aluminum oxide layer. However, this method does not provide good adhesion between the Mg alloy and the Al plating layer, and the layer can separate form the alloy. The adhesion between the Mg alloy and the Al plating layer is poor because Mg present in the Mg alloy functioning as a base is extremely susceptible to oxidation, and a Mg oxide layer is generally formed on the surface of the alloy, and the adhesion between the Mg oxide layer and the Al plating layer is poor.

In order to enhance the adhesion between a material susceptible to oxidation and an Al plating layer thereon, JP-A-05-186893 describes forming an intermediate coating between the material and the Al plating layer. Examples of the intermediate coating are plating layers of nickel (Ni), cobalt (Co), zinc (Zn), or the like. In particular, the plating layers subjected to an anode dissolving treatment are useful. Such an intermediate coating was able to prevent the surface of Mg susceptible to oxidation from being oxidized, thereby enhancing adhesion between the Mg and the Al plating layer.

However, because Mg is extremely susceptible to oxidation, the method of forming an intermediate coating also does not provide sufficient adhesion between a Mg alloy and the intermediate coating. Therefore, a magnesium alloy member having the structure has good adhesion between the Al plating layer and the intermediate coating, whereas separation can occur at the interface between the Mg alloy and the intermediate coating. A magnesium alloy member having insufficient coating adhesion tends to have poor corrosion resistance.

In a magnesium alloy member 301 the section view of which is shown in FIG. 7, which member is an embodiment of the present invention, a nickel (Ni) plating layer 20, an aluminum (Al) plating layer 30, and an aluminum oxide layer 40 are formed on a magnesium (Mg) alloy 310. Herein, the magnesium alloy 310 is the base of the magnesium alloy member, and an example of the alloy is AZ31 in accordance with Japan Industrial Standard which alloy contains 3% of aluminum (Al) and 1% of zinc (Zn) and has a thickness of 0.8 mm. The Ni plating layer 20 is formed on the magnesium alloy 310 by plating and mainly contains Ni. The Al plating layer 30 is formed on the Ni plating layer 20 by plating and mainly contains Al. The aluminum oxide layer 40 is formed on the Al plating layer 30 by oxidizing the Al plating layer 30 as mentioned later.

FIG. 8 is a flow chart showing a method for producing a magnesium alloy member which method is an embodiment according to the present invention. The production method is composed of steps S11 to S16 shown in FIG. 8. The production method includes a nickel (Ni) plating step S13 of forming a Ni plating layer 20; an aluminum (Al) plating step S14 of forming an Al plating layer 30; a heat treatment step S15; and subsequently an anodizing step S16 of forming an aluminum oxide layer 40. The method also includes, prior to the Ni plating step S13, a Mg oxide film etching step S12 for the purpose of enhancing adhesion of the Ni plating layer 20. The Mg oxide film etching step S12 is composed of steps S21 to S25 shown in detail in FIG. 9.

Hereinafter, each of the steps is described in detail.

First, in S11, a Mg alloy 310 to be the base of a magnesium alloy member is prepared. An example of the alloy is AZ31 in accordance with Japan Industrial Standard which alloy contains 3% of aluminum (Al) and 1% of zinc (Zn) and has a thickness of 0.8 mm. The AZ31 is lightweight and has sufficient strength, and thus preferable as material for casings.

Next, the Mg alloy 310 is subjected to the magnesium (Mg) oxide film etching step S12. The Mg alloy 310 is susceptible to oxidation and the topmost surface of the alloy becomes oxide. The step removes the oxide to enhance adhesion between the alloy and a Ni plating layer to be formed later. The Mg oxide film etching step S12 is shown in a detailed flow chart in FIG. 9. The steps in the figure are conducted by immersing the alloy into the respective solutions (the solutions are described under the names of products manufactured by Meltex Inc.) at the respective temperatures shown in the figure. The degreasing (S21) in the figure is a step of removing grease on the surface of the Mg alloy prior to removing the oxide to enhance the effect of removing the oxide. The primary etching (S22) and the secondary etching (S24) are steps of removing the oxide by etching. For example, the AZ31 subjected to the oxide etching has the so-called smut layer with decreased Mg ratio in the surface composition of the alloy because etching rate against Mg is larger than etching rates against Al and Zn. To the surface with the composition, the adhesion of the Ni plating layer is poor in the Ni plating step conducted later. The smut removal (S23) is a step of removing the smut layer. In the embodiment, in order to remove the smut layer and remove the oxide effectively, the etching of the oxide is divided into the primary etching (S22) and the secondary etching (S24), and the smut removal (S23) is conducted between the etchings. The activation treatment (S25) is a step of activating thus obtained surface by using a Melplate MG5301, which is a palladium activating solution, for the purpose of preparing the surface for conducting the subsequent Ni plating efficiently. Up to this point there has been described in detail the Mg oxide film etching step S12.

Next, the Ni plating step S13 in FIG. 8 is conducted. In the step, the Ni plating layer 20 is formed on the surface of the magnesium alloy 310 by electroless Ni plating. To conduct the plating, the Mg alloy 310 is immersed, for example, in Melplate MG5401 (a trade name, manufactured by Meltex Inc.) at 70° C. By adjusting time for the immersion, the thickness of the Ni plating layer 20 can be adjusted. The thickness is preferably 8 to 12 µm. Note that the Ni plating layer 20 formed by electroless plating contains phosphorus (P).

In the Ni plating step S13, leaching of Mg and deposition of Ni occur simultaneously because Mg has high ionization tendency. Therefore, thus obtained Ni plating layer 20 often has pin holes. When the Ni plating layer 20 has a pin hole reaching the surface of the magnesium alloy 310, Mg can leach in a plating solution in the Al plating step S14 mentioned later. When the Ni plating layer 20 has a thickness equal to or greater than 8 µm, the layer has less chance of having pin holes reaching the surface of the Mg alloy 310 and the Al plating step S14 is conducted well. There is no need for the Ni plating layer 20 to have a thickness greater than 12 µm because the layer functions just as the base of the Al plating layer 30 thereon.

Next, the Al plating step S14 is conducted. In the step, the Al plating layer 30 is formed on the Ni plating layer 20. The Al plating is preferably conducted by electroplating. A plating solution for the plating is, for example, a solution containing dimethyl sulfone ($DMSO_2$) as solvent and anhydrous aluminum chloride (III) ($AlCl_3$) as solute. The molar ratio of $DMSO_2:AlCl_3$ is 5:1. $DMSO_2$ and $AlCl_3$ are mixed in a beaker, heated at 50° C. for 2 hours and at 80° C. for 2 hours, and subsequently heated to 110° C. to prepare the plating solution. After that, the Al plating layer 30 is formed by immersing an aluminum plate as an anode and the magnesium alloy 310 as a cathode on which the Ni plating layer 20 is formed in the plating solution and passing current through the solution. The temperature in the plating is about 110° C. and the time for the plating is typically about 20 minutes. Depending on the time, the thickness of the Al plating layer 30 can be adjusted. The current density of the plating is preferably about 10 $A/dm^2$.

Next, the heat treatment step S15 is conducted. The heat treatment is conducted to the Mg substrate 310 on which the Al plating layer 30 is thus formed. The heat treatment is preferably conducted at a temperature of from 180° C. to 300° C. The treatment is preferably conducted in air. By conducting the heat treatment, adhesion at the interface between the Mg alloy and the Ni plating layer is particularly enhanced.

The adhesion is enhanced because the heat treatment reduces the ununiform deformation of the Ni plating layer. FIG. 10 shows results of measuring the X-ray diffraction property (rocking curve) of the Ni plating layer 20 before and after a heat treatment at 270° C. with varying the time for the heat treatment. In the figure, the gentle peak with 2θ at about 44.5° is the original diffraction peak of the Ni plating layer 20. Other peaks are influenced by the Mg substrate 310, which is the base of the layer 20. From the results, the longer the time for the heat treatment becomes, the steeper the diffraction peak of the Ni plating layer 20 becomes. That is, the heat treatment reduces the ununiform deformation of the Ni plating layer 20. In general, a plating layer has better adhesion to its base when the internal stress of the layer is compression compared to when the internal stress is pulling. The heat treatment reduces the ununiform deformation and the internal stress of the Ni plating layer 20 is changed from pulling, before the heat treatment, to compression. As a result, adhesion at the interface between the Mg alloy 310 and the Ni plating layer 20 is enhanced. On the other hand, FIG. 11 shows the results of measuring the X-ray diffraction property of the Al plating layer 30 in the manner similar to that in FIG. 10. Herein, peaks with 2θ at about 38.5° and 44.8° are the diffraction peaks of the Al plating layer 30. The peaks are steep and do not change their shapes regardless of the presence or absence of the heat treatment and the time for the heat treatment. Therefore, the heat treatment does not change the internal stress of the layer. The internal stress of the Al plating layer 30 is thus compression before and after the heat treatment without being changed, and adhesion between the Al plating layer 30 and the Ni plating layer 20 is good regardless of the heat treatment. In summary, the heat treatment step S15 particularly changes the internal stress of the Ni plating layer 20 to compression, thereby enhancing adhesion between the Ni plating layer 20 and the Mg alloy 310. As a result, the magnesium alloy member 301 is less prone to separation between the Ni plating layer 20 and the Mg alloy 310.

When the temperature of the heat treatment is higher than 300° C., phosphorus (P) and Ni contained in the Ni plating layer 20 form an alloy and the layer 20 becomes brittle. When the temperature is less than 180° C., the internal stress of the layer is not sufficiently changed and the adhesion is not enhanced sufficiently.

As mentioned above, the heat treatment is conducted after the Al plating step S14. When the heat treatment is conducted after the Ni plating step S13, just the same effect is given to the internal stress of the Ni plating layer 20. In this case, however, the surface of the Ni plating layer 20 is oxidized and adhesion between the Al plating layer 30 and the Ni plating layer 20 becomes poor. Then the case requires an additional step of removing the oxide on the surface of the Ni plating layer 20, thereby increasing the complexity of the steps. Therefore, it is not preferable to conduct the heat treatment after the Ni plating step S13.

Next, the anodizing step S16 is conducted. When the magnesium alloy member is used as a material for the casing, the step is particularly used for forming an aluminum oxide layer 40 on the surface of the member. The anodizing step S16 is conducted, for example, by passing current through the magnesium alloy member as a cathode in a solution consisting of sulfuric acid and aluminum sulfate as with the Al plating. In this case, it is preferred that the temperature is 25° C. and the current density is about 0.2 A/dm$_2$. The thickness of the aluminum oxide layer 40 to be formed can be adjusted depending on the time of passing current.

In this case, the aluminum oxide layer 40 is formed by oxidizing the previously formed Al plating layer 30. That is, the thicker the aluminum oxide layer 40 becomes, the thinner the Al plating layer 30 to be left becomes. Herein, the Al plating layer 30 left after the completion of the anodizing step S16 preferably has a thickness of 12 to 150 μm. When the Al plating layer 30 has a thickness less than 12 μm, in the anodizing step S16, the Ni plating layer 20 partly leaches via pin holes present in the Al plating layer 30, and the surface of the Mg alloy 310 under the layer 20 can be exposed. When the Al plating layer 30 has a thickness equal to or greater than 12 μm, the pin holes have less chance of reaching the Ni plating layer 20. The Al plating layer 30 with a thickness greater than 150 μm tends to have cracks.

By the production method mentioned above, the magnesium alloy member 301 according to an embodiment of the present invention can be obtained. In the magnesium alloy member 301, compressive stress is applied to the Ni plating layer 20 and the Al plating layer 30 and adhesion between the layers are good. That is, the magnesium alloy member 301 is less prone to separation between the layers and lightweight. Thus there is obtained the lightweight magnesium alloy member less prone to separation between the layers, and the member can be preferably used as a material for casings.

The embodiment mentioned above includes the anodizing step S16, and the step is employed for forming the aluminum oxide layer 40 on the topmost surface of the magnesium alloy member. When a magnesium alloy member not having the aluminum oxide layer 40 on its surface is produced, the anodizing step S16 is not necessary. This case also provides a magnesium alloy member less prone to separation between its layers.

Although the embodiment mentioned above includes the Mg oxide film etching step S12, there are some cases where oxide is not formed on the Mg alloy 310 enough to reduce the adhesion between the alloy 310 and the Ni plating layer 20, for example, depending on the composition of the Mg alloy 310. In these cases, any of steps S21 to S25 in the Mg oxide film etching step S12 (FIG. 9) may be omitted. It is also possible to omit the whole Mg oxide film etching step S12.

Example 3

Hereinafter, there is described an example according to the present invention. By using the production method described so far, a magnesium alloy member was produced by subjecting a Mg alloy to the steps up to the Al plating step and the heat treatment step. The magnesium alloy member and comparative example magnesium alloy members having similar structures were compared in respect to generation of the separation between the layers and corrosion resistance to corrosive solutions.

The separation (adhesion) was evaluated as follows: slits were made with 1.5 mm pitches on the surface of an evaluation sample (magnesium alloy member) to form 10×10 squares by using a cutter; cellophane tape was affixed to the squares; when the tape was removed, a square where separation occurs in 80% or more of the square area was defined as a "separated square"; the number of the "separated square" was counted; based on the result, the ratio of squares other than the "separated squares" was defined as adhesion ratio (%); a sample with an adhesion ratio of 100% was evaluated to have satisfactory adhesion.

First, an AZ31 as the Mg alloy 310 was subjected to the Mg oxide film etching step S12, the Ni plating step S13, and the Al plating step S14 to prepare a sample having a Ni plating layer 20 with a thickness of 10 μm and an Al plating layer 30 with a thickness of 40 μm on the AZ31. By using the sample, variation of the adhesion ratio was examined in the presence or absence of the heat treatment step S15 with varying the times for the primary etching and the secondary etching in FIG. 9. The heat treatment step S15 was conducted at 200° C. for 30 minutes in air.

FIG. 12 shows results of comparing the relationship of the primary etching time and the adhesion ratio in the Mg oxide film etching step S12 between the presence and absence of the heat treatment step in respect to the sample. The time for the secondary etching was 10 minutes. In FIG. 12, the black circles represent a sample subjected to the heat treatment step S15 (an example according to the present invention), and the white circles represent a sample not subjected to the heat treatment step S15 (a comparative example). When the primary etching time is greater than 6 minutes, the adhesion ratio is conversely deteriorated because Mg is further etched selectively and a smut layer formed in the surface gets thicker. The example according to the present invention subjected to the heat treatment step S15 shows higher adhesion ratios regardless of the primary etching time than the comparative example not subjected to the heat treatment step S15. In particular, while the primary etching time is 4 to 6 minutes, the example shows adhesion ratios of 100%.

FIG. 13 shows results of comparing the relationship of the secondary etching time and the adhesion ratio in the Mg oxide film etching step S12 between the presence and absence of the heat treatment step S15 in respect to a sample similar to the sample in FIG. 12. The time for the primary etching was 5 minutes. In FIG. 13, the black circles represent a sample subjected to the heat treatment step S15 (an example according to the present invention), and the white circles represent a sample not subjected to the heat treatment step S15 (a comparative example). The example according to the present invention subjected to the heat treatment step S15 shows higher adhesion ratios regardless of the secondary etching time than the comparative example not subjected to the heat treatment step S15. In particular, while the secondary etching time is 10 minutes or more, the example shows adhesion ratios of 100%.

FIG. 14 is a bar graph showing the results of comparing the adhesion ratios of the samples subjected to the primary etching for 5 minutes and the secondary etching for 10 minutes among a case of conducting the heat treatment step after the Al plating step S14 (Example 3 according to the present invention), a case of not conducting any heat treatment step (Comparative Example 2), and a case of conducting the heat treatment step not after the Al plating step but after the Ni plating step S13 (Comparative Example 3). The black circles in FIG. 14 represent the results of evaluation points according to square tests, for example, described in "Surface Finishing Handbook", edited by The Surface Finishing Society of Japan, published by THE NIKKAN KOGYO SHIMBUN, LTD., p. 55 (1998). The evaluation points were calculated based on the following standard: a case where separation occurs over the whole 10×10 squares scores 0 point; a case where no separation occurs over the whole 10×10 squares scores 10 point; a case where separation occurs in a degree between the former two cases scores 0 to 10 points depending on the degree of the separation. The error bars represent the variation ranges of the points. From the results, it has been established that only the example subjected to the heat treatment step after the Al plating step S14 according to the present invention provides good adhesion ratio.

In Table 2, there are shown the results of immersion experiments of casings prepared in Example 3, and Comparative Examples 2 and 3 in the same manner as Example 1. The casing prepared in Example 3 showed sufficient corrosion resistance to any corrosive solutions without corrosion or discoloration. The casing prepared in Comparative Example 2 showed sufficient corrosion resistance to a 5% acetic acid solution and a 10% hydrochloric acid solution, whereas the casing was corroded in a 5% formic acid solution in about 360 hours and showed insufficient corrosion resistance to the solution. The casing prepared in Comparative Example 3 was corroded in a 5% formic acid solution in about 240 hours and showed insufficient corrosion resistance to the solution.

TABLE 2

| | Immersion time until casing is corroded | | |
|---|---|---|---|
| | 5% formic acid solution | 5% acetic acid solution | 10% hydrochloric acid solution |
| Example 3 | >960 h | >960 h | >960 h |
| Comparative Example 2 | 360 h | >960 h | >960 h |
| Comparative Example 3 | 240 h | >960 h | 600 h |

INDUSTRIAL APPLICABILITY

A casing according to the present invention is used for a liquid fuel cell producing electricity by using liquid fuel such as methanol. The casing containing electrodes, a proton exchange membrane, and the like has enhanced corrosion resistance and acid resistance to acid solutions such as formic acid produced during electricity generation.

BRIEF DESCRIPTION OF THE DRAWINGS

FIG. 9 is a flow chart showing in detail a Mg oxide film etching step in a method for producing a casing made of a magnesium alloy which method is an embodiment according to the present invention;

FIG. 10 is a graph showing variations in the X-ray diffraction property of a Ni plating layer depending on the presence or absence of a heat treatment and the time for the heat treatment;

Figure 1:
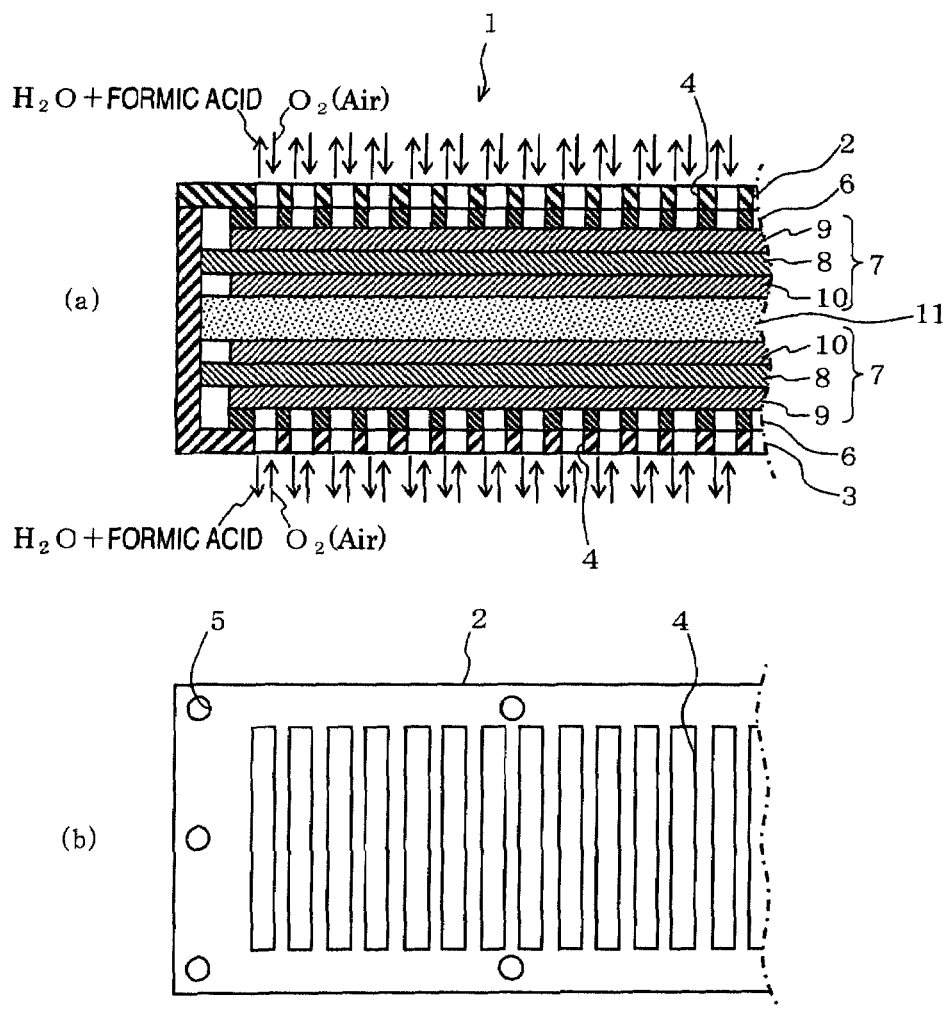
FIG. 1 is a section view (a) and a plan view (b) of a DMFC equipped with a casing according to the present invention.
Figure 2:
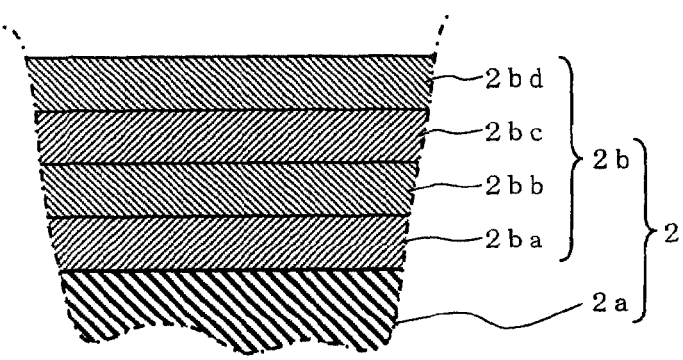
FIG. 2 is a partly enlarged section view of a casing according to the present invention.
Figure 3:
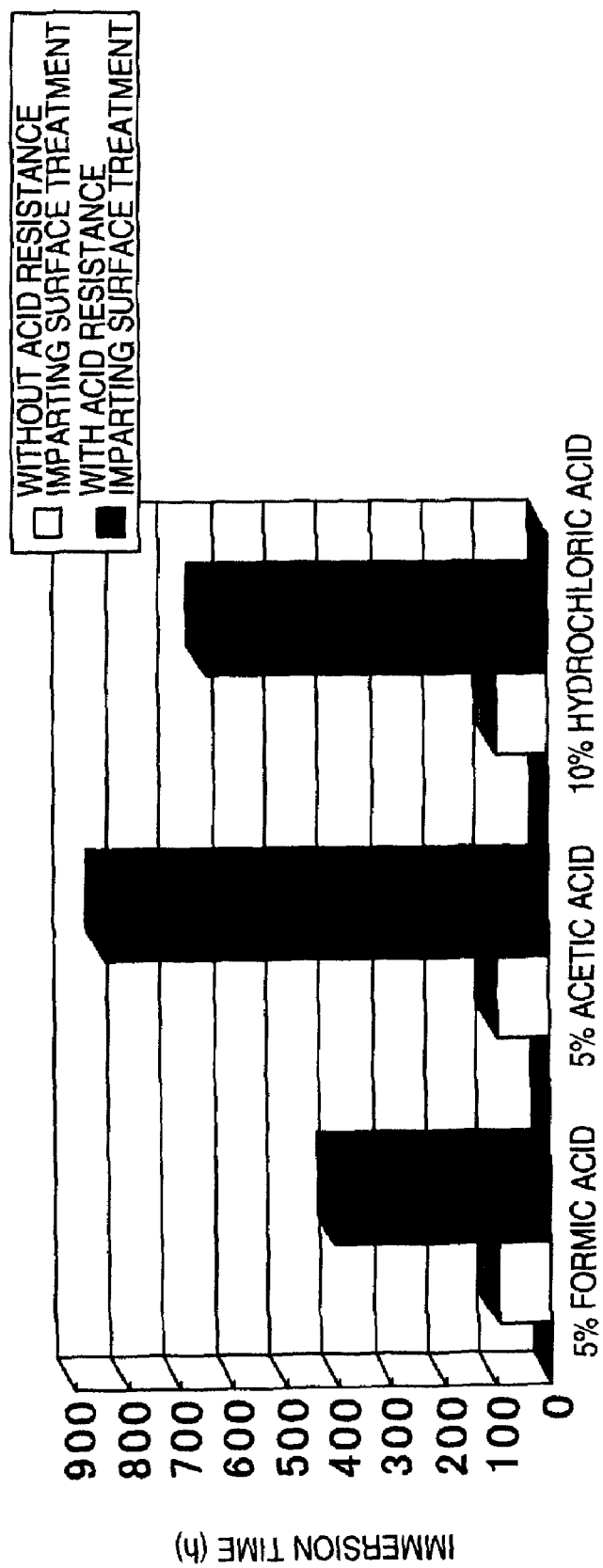
FIG. 3 is a graph showing the results of immersion experiments for studying the corrosion resistance of a casing according to the present invention.
Figure 4:
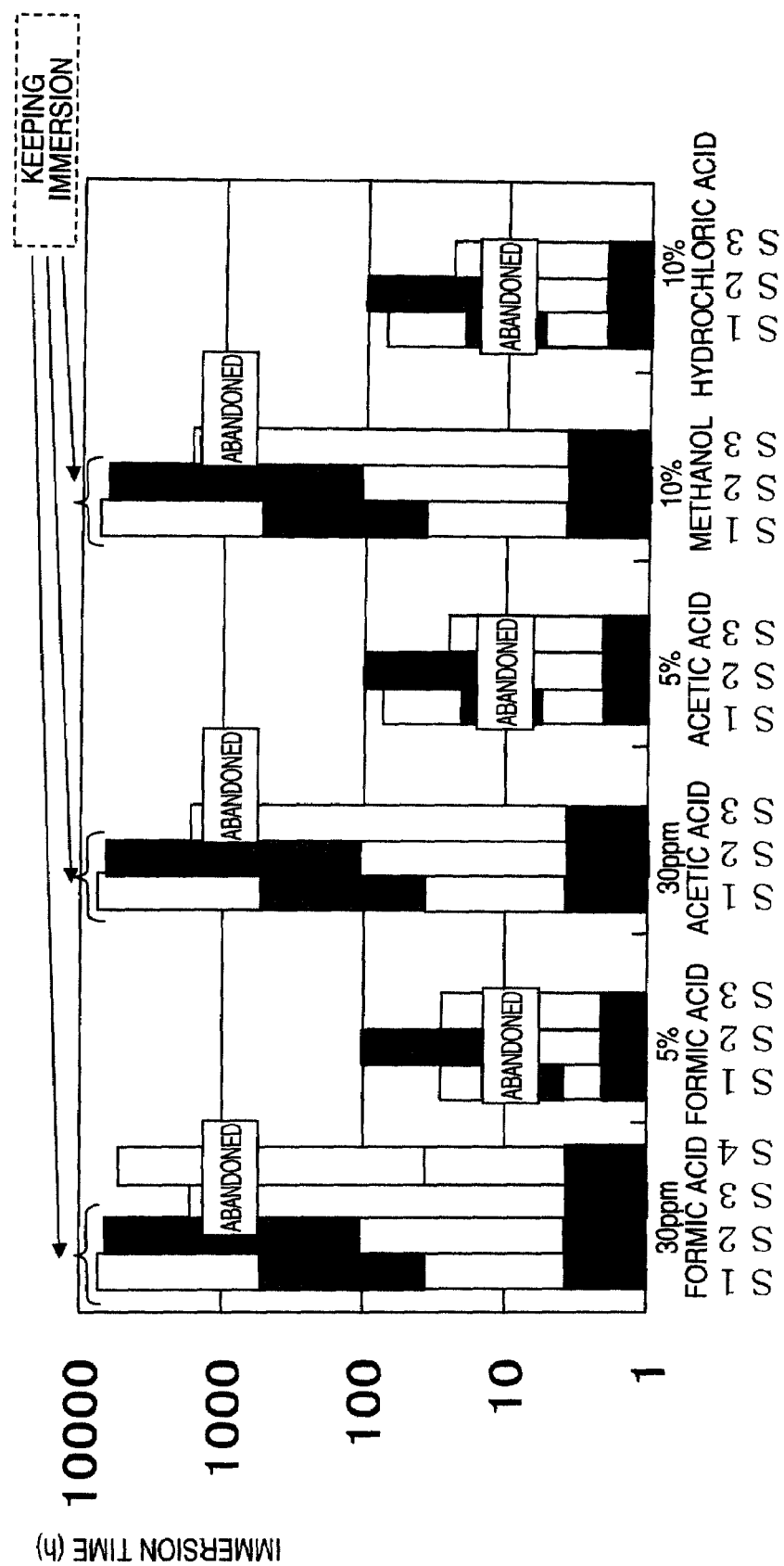
FIG. 4 is a graph showing the results of immersion experiments for studying the corrosion resistances of casings according to the present invention and comparative examples.
Figure 5:
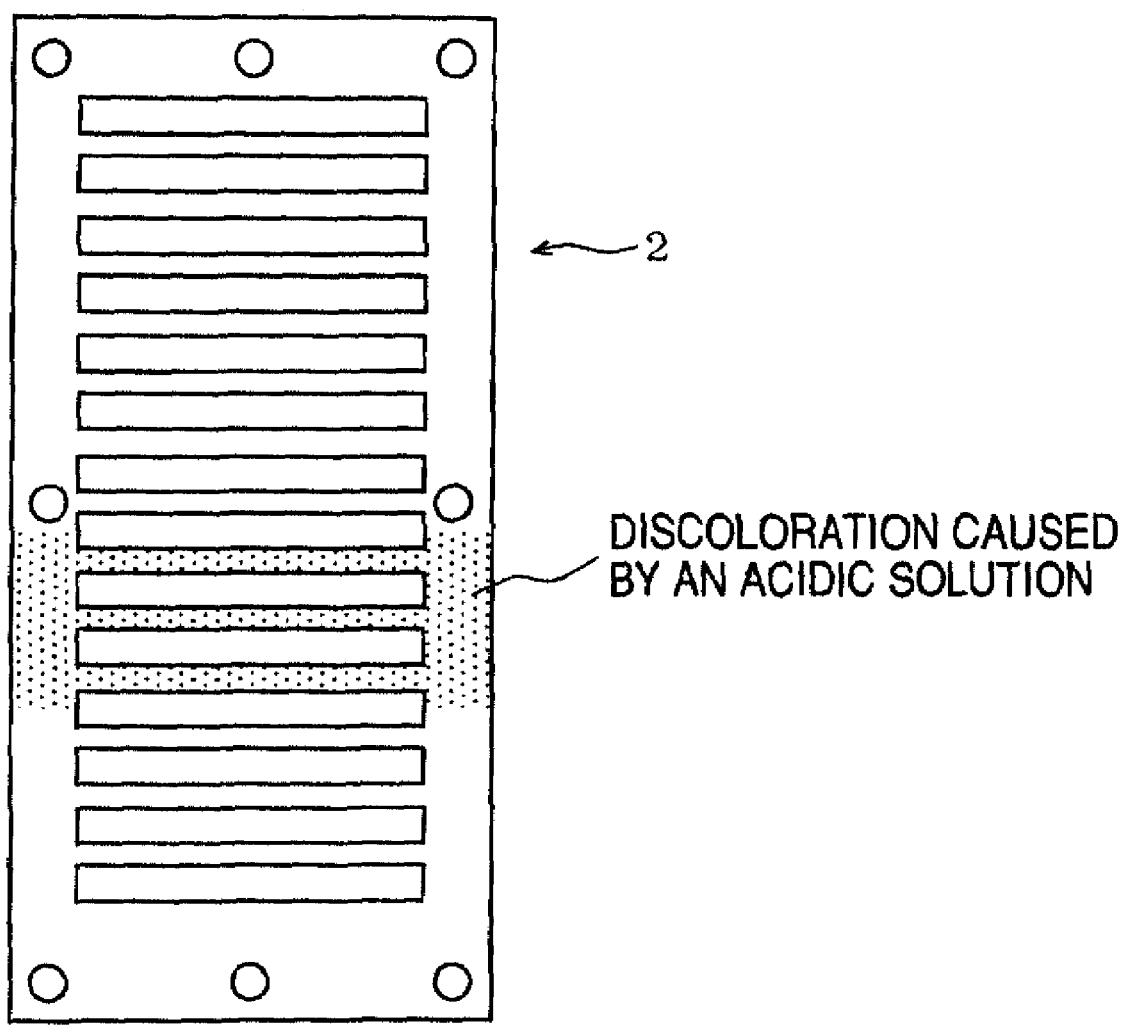
FIG. 5 is a schematic view of an experimental sample discolored in an immersion experiment.
Figure 6:
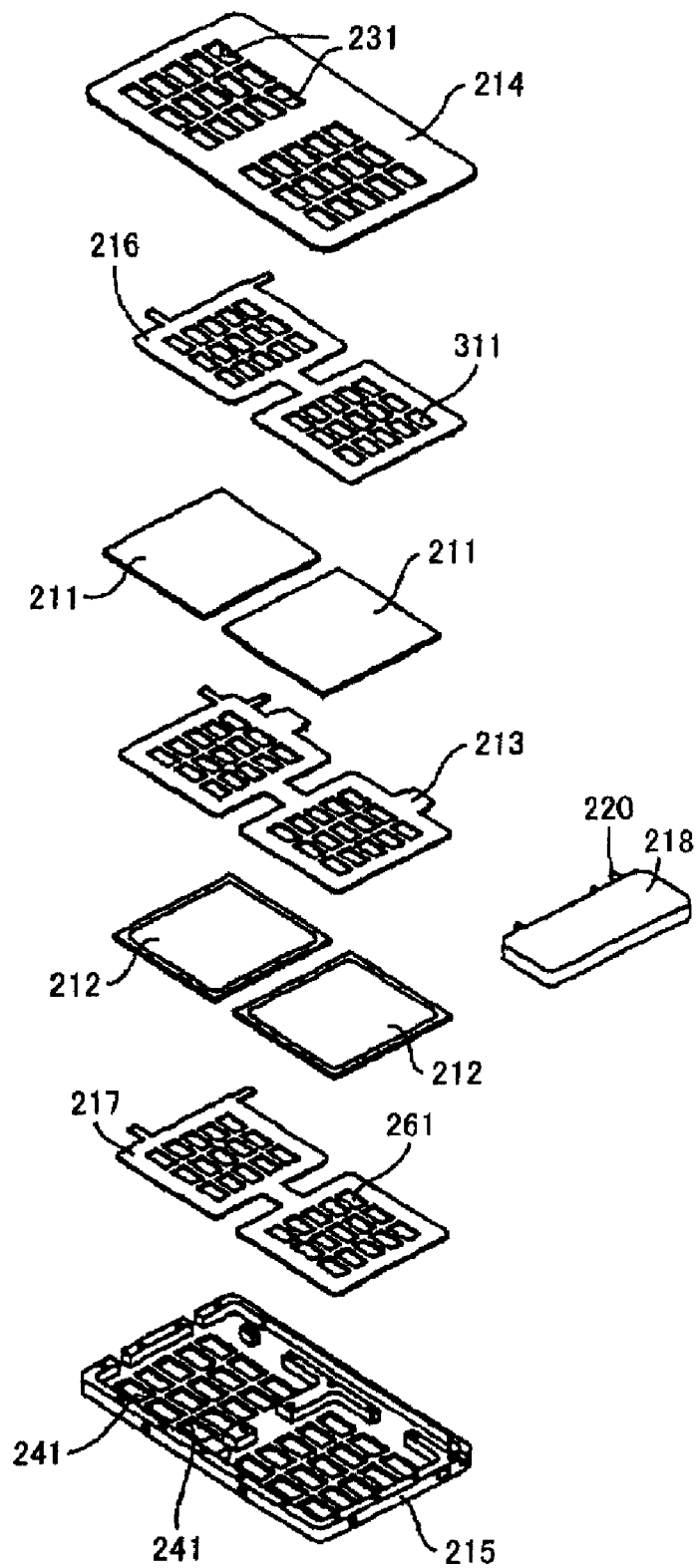
FIG. 6 is an illustration showing a conventional casing for fuel cells.
Figure 7:
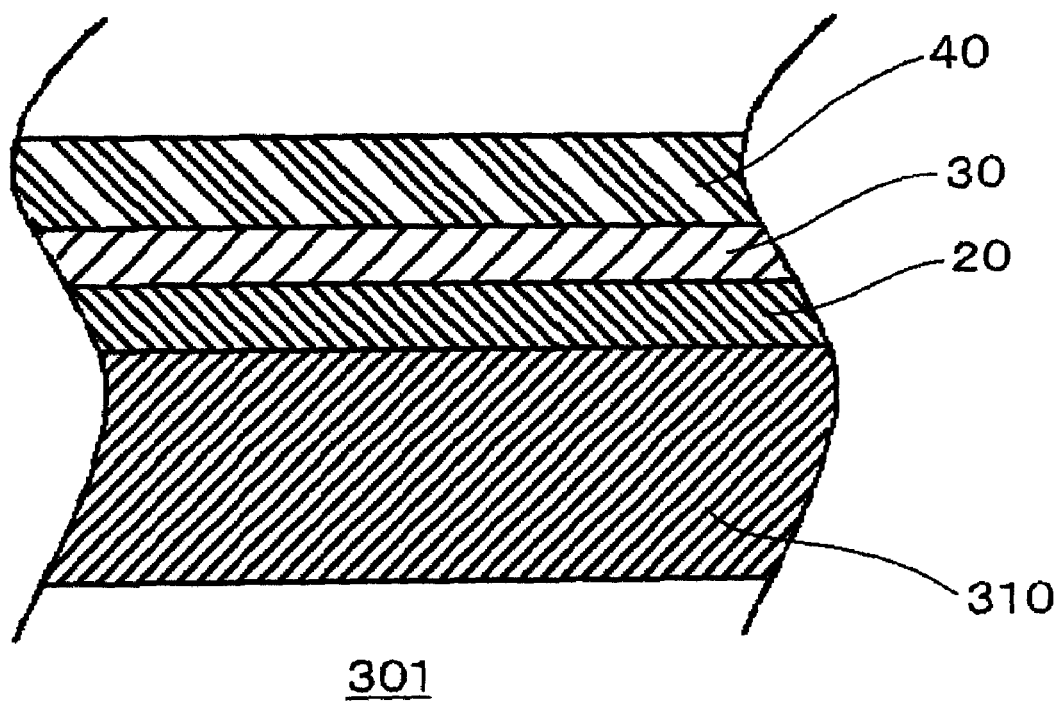
FIG. 7 is a section view of a casing made of a magnesium alloy which casing is an embodiment according to the present invention.
Figure 8:
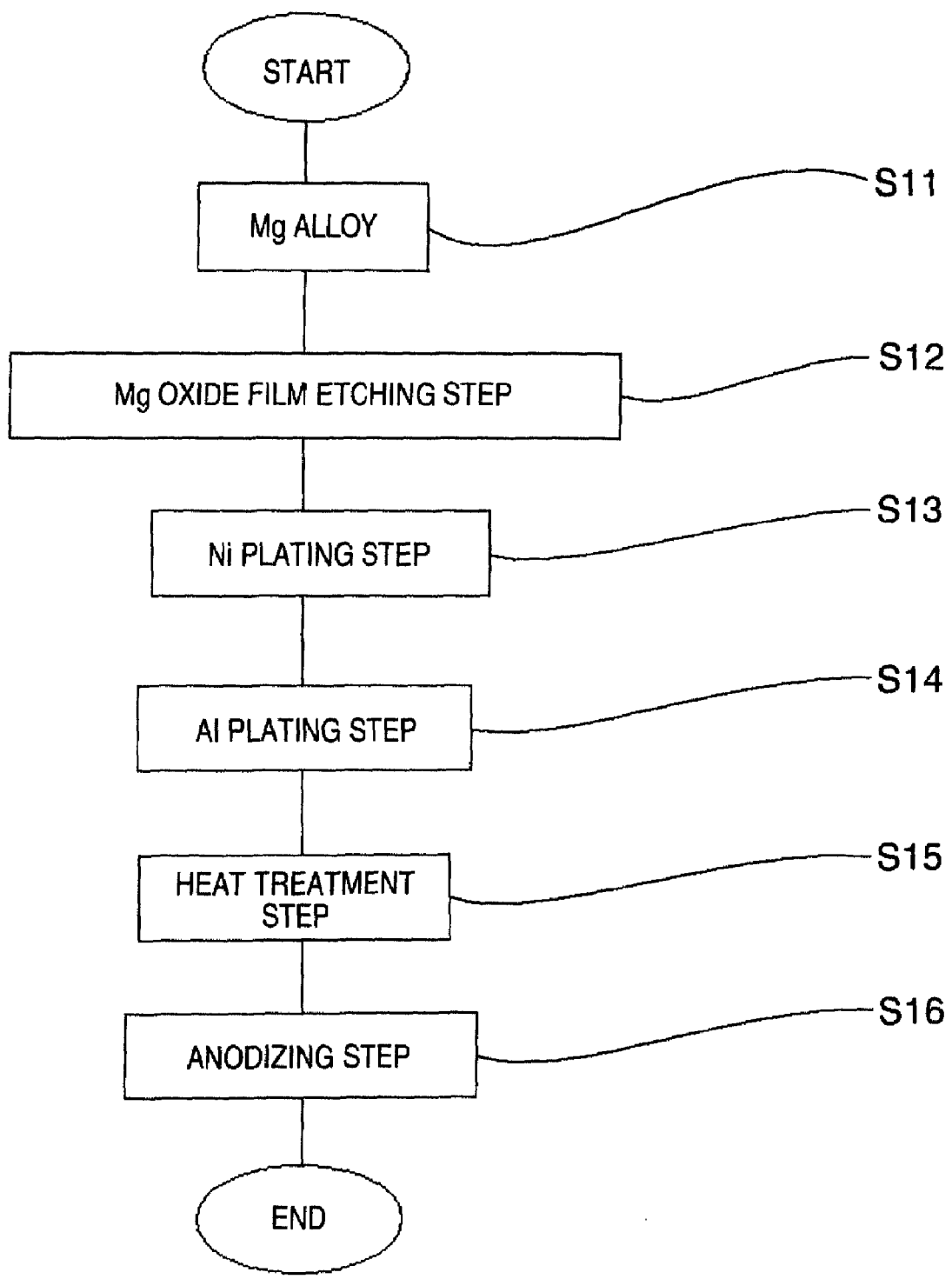
FIG. 8 is a flow chart showing a method for producing a casing made of a magnesium alloy which method is an embodiment according to the present invention.
Figure 11:
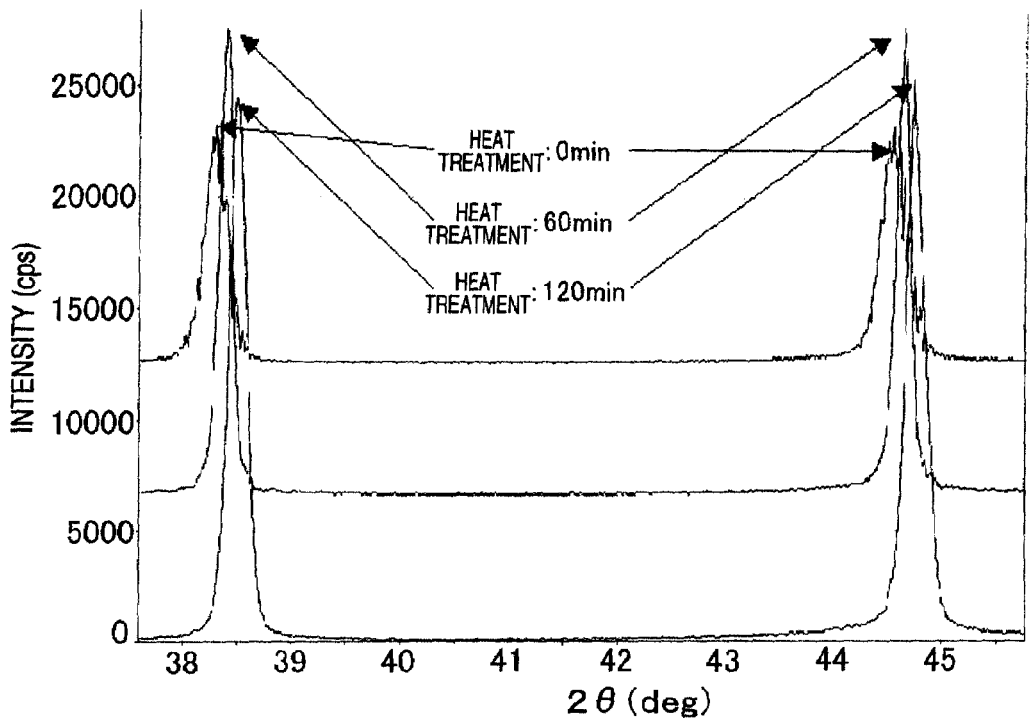
FIG. 11 is a graph showing variations in the X-ray diffraction property of an Al plating layer depending on the presence or absence of a heat treatment and the time for the heat treatment.
Figure 12:
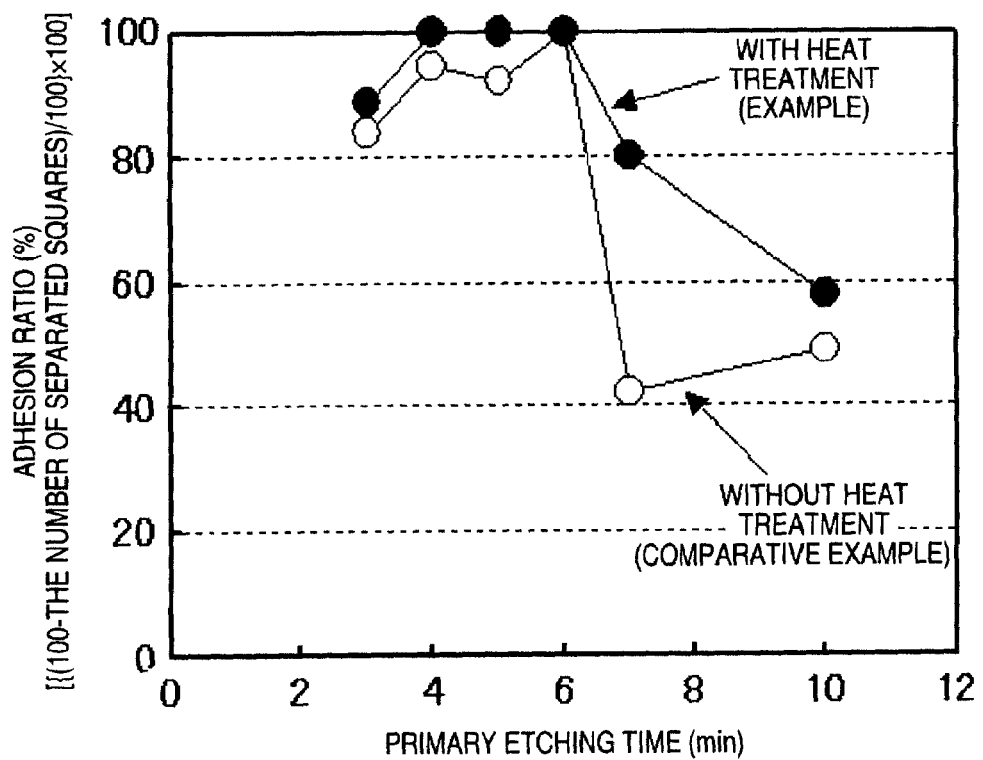
FIG. 12 is a graph comparing the relationships of primary etching time and adhesion ratio between an example according to the present invention and a comparative example (the difference between the examples is the presence of a heat treatment)
Figure 13:
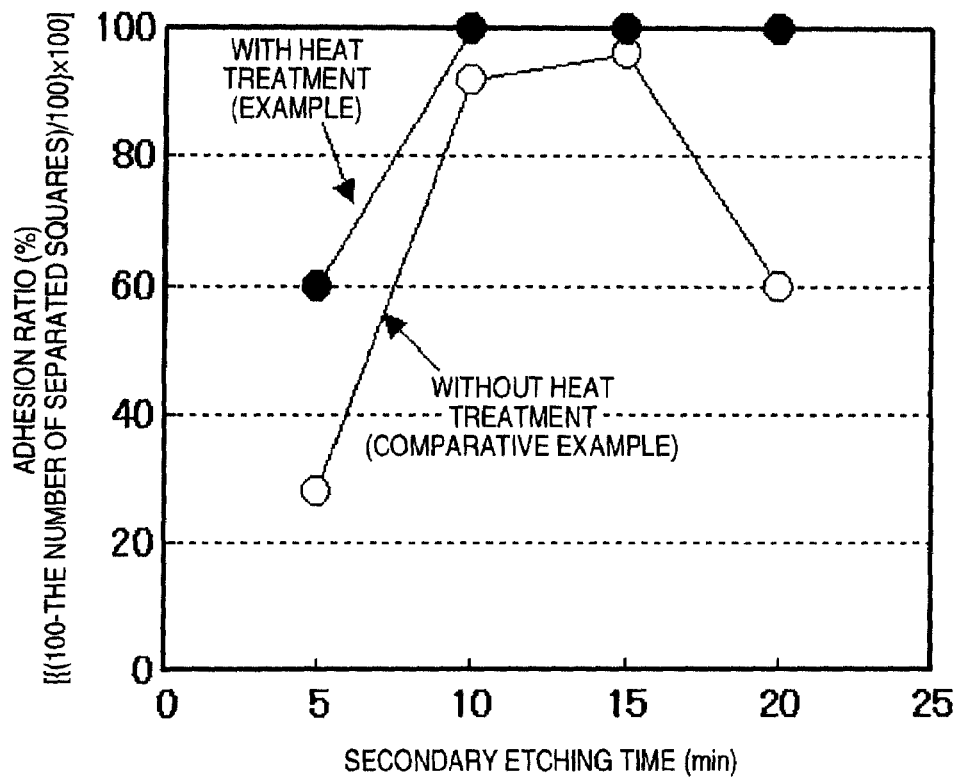
FIG. 13 is a graph comparing the relationships of secondary etching time and adhesion ratio between an example according to the present invention and a comparative example (the difference between the examples is the presence of a heat treatment)
Figure 14:
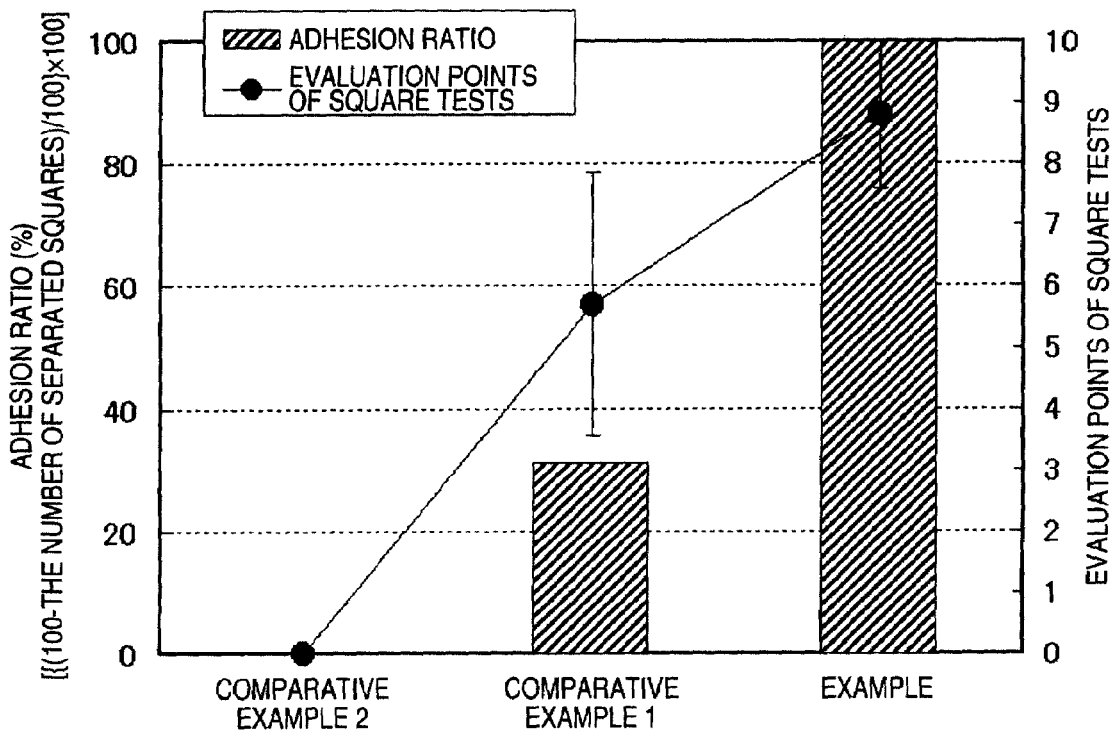
FIG. 14 is a graph showing the results of comparing the adhesion ratios of an example according to the present invention, a comparative example without a heat treatment, and a comparative example where a heat treatment is conducted after an Al plating step.

| DESCRIPTION OF REFERENCE NUMERALS | |
|---|---|
| 1 | fuel cell |
| 2 | upper casing |
| 2a | magnesium alloy |
| 2b | coating |
| 2ba | chemical conversion coating: manganese phosphate based |
| 2bb | undercoating layer (primer): epoxy based |
| 2bc | overcoating layer (color coating): acryl based |
| 2bd | clear coating layer: acrylic silicon based |
| 3 | lower casing |
| 4 | venting hole |
| 5 | screw hole |
| 6 | current collecting plate |
| 7 | membrane and electrode assembly |
| 8 | proton exchange membrane |
| 9 | oxygen electrode |
| 10 | hydrogen electrode |
| 11 | liquid fuel retaining member |
| 301 | magnesium alloy casing |
| 310 | magnesium (Mg) alloy |
| 20 | nickel (Ni) plating layer |
| 30 | aluminum (Al) plating layer |
| 40 | aluminum oxide layer |

The invention claimed is:

1. A method for producing a casing for a fuel cell which casing has aluminum formed on a magnesium alloy, characterized by comprising a nickel plating step of forming a plating layer mainly containing nickel on the magnesium alloy; an aluminum plating step of forming a plating layer mainly containing aluminum on the plating layer mainly containing nickel; and a heat treatment step of conducting a heat treatment after the aluminum plating step.

2. The method for producing a casing for a fuel cell according to claim 1, characterized by comprising an anodizing step of anodizing the plating layer mainly containing aluminum to form an aluminum oxide layer after the heat treatment step.

3. The method for producing a casing for a fuel cell according to claim 1, characterized by conducting the heat treatment step at a temperature of from 180° C. to 300° C.

4. The method for producing a casing for a fuel cell according to claim 1, characterized by conducting the heat treatment step in air.

5. The method for producing a casing for a fuel cell according to claim 1, characterized by comprising a magnesium oxide film etching step of removing an oxide layer on a surface of the magnesium alloy by wet etching before the nickel plating step.

* * * * *